United States Patent
Asai

(10) Patent No.: US 10,666,830 B2
(45) Date of Patent: *May 26, 2020

(54) NON-TRANSITORY COMPUTER-READABLE MEDIUM AND PORTABLE TERMINAL

(71) Applicant: BROTHER KOGYO KABUSHIKI KAISHA, Nagoya-shi, Aichi-ken (JP)

(72) Inventor: Norihiko Asai, Tajimi (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/555,018

(22) Filed: Aug. 29, 2019

(65) Prior Publication Data

US 2019/0387121 A1 Dec. 19, 2019

Related U.S. Application Data

(63) Continuation of application No. 15/961,988, filed on Apr. 25, 2018, now Pat. No. 10,404,884.

(30) Foreign Application Priority Data

Apr. 26, 2017 (JP) .................................. 2017-087110

(51) Int. Cl.
| | |
|---|---|
| *H04N 1/23* | (2006.01) |
| *H04N 1/32* | (2006.01) |
| *H04N 1/327* | (2006.01) |

(52) U.S. Cl.
CPC ....... *H04N 1/2315* (2013.01); *H04N 1/32064* (2013.01); *H04N 1/32773* (2013.01); *H04N 2201/0041* (2013.01)

(58) Field of Classification Search
CPC ............. H04N 1/2315; H04N 1/32064; H04N 1/32773; H04N 1/00411; H04N 1/00307; H04N 2201/0094; H04N 2201/0041
(Continued)

(56) References Cited

U.S. PATENT DOCUMENTS

| | | | |
|---|---|---|---|
| 8,947,696 B1 * | 2/2015 | Uyttendaele | .......... G06F 3/1203 358/1.15 |
| 2012/0212759 A1 ‡ | 8/2012 | Murata | .................. G06F 3/1204 358/1.13 |

(Continued)

FOREIGN PATENT DOCUMENTS

| | | | | |
|---|---|---|---|---|
| JP | 2017-004078 A | ‡ | 1/2017 | ......... H04N 1/00307 |
| JP | 2017-004078 A | | 1/2017 | |

(Continued)

*Primary Examiner* — Allen H Nguyen
(74) *Attorney, Agent, or Firm* — Merchant & Gould P.C.

(57) ABSTRACT

A portable terminal has a memory having a program stored thereon and readably by a computer. The program causes the portable terminal to perform searching an image processing apparatus capable of executing an image processing operation by a first method, determining whether the image processing apparatus is detected in the searching by the first method, searching the image processing apparatus by a second method in a case where it is determined that the image processing apparatus is not detected as a result of the searching by the first method, storing apparatus information for identifying the image processing apparatus detected in the searching by the first method or the searching by the second method, and transmitting operation instruction information for instructing execution of the image processing operation to the image processing apparatus identified with the designated apparatus information stored.

14 Claims, 11 Drawing Sheets

(58) Field of Classification Search
USPC .......................................................... 358/1.15
See application file for complete search history.

(56) References Cited

U.S. PATENT DOCUMENTS

| | | | | |
|---|---|---|---|---|
| 2014/0268235 | A1 ‡ | 9/2014 | Chiou ................... | G06F 3/1232 |
| | | | | 358/1.15 |
| 2016/0078583 | A1 * | 3/2016 | Nishitani ................. | G06T 7/73 |
| | | | | 700/259 |
| 2016/0081132 | A1 * | 3/2016 | Lee ........................ | H04W 76/10 |
| 2016/0112839 | A1 ‡ | 4/2016 | Choi ....................... | H04W 4/023 |
| | | | | 455/41.2 |
| 2016/0357405 | A1 ‡ | 12/2016 | Asai .................... | H04N 1/00411 |
| 2016/0378408 | A1 * | 12/2016 | Asano ................... | G06F 3/1205 |
| | | | | 358/1.15 |

FOREIGN PATENT DOCUMENTS

| | | | |
|---|---|---|---|
| JP | 2017-062736 A | ‡ | 3/2017 |
| JP | 2017-062736 A | | 3/2017 |

\* cited by examiner
‡ imported from a related application

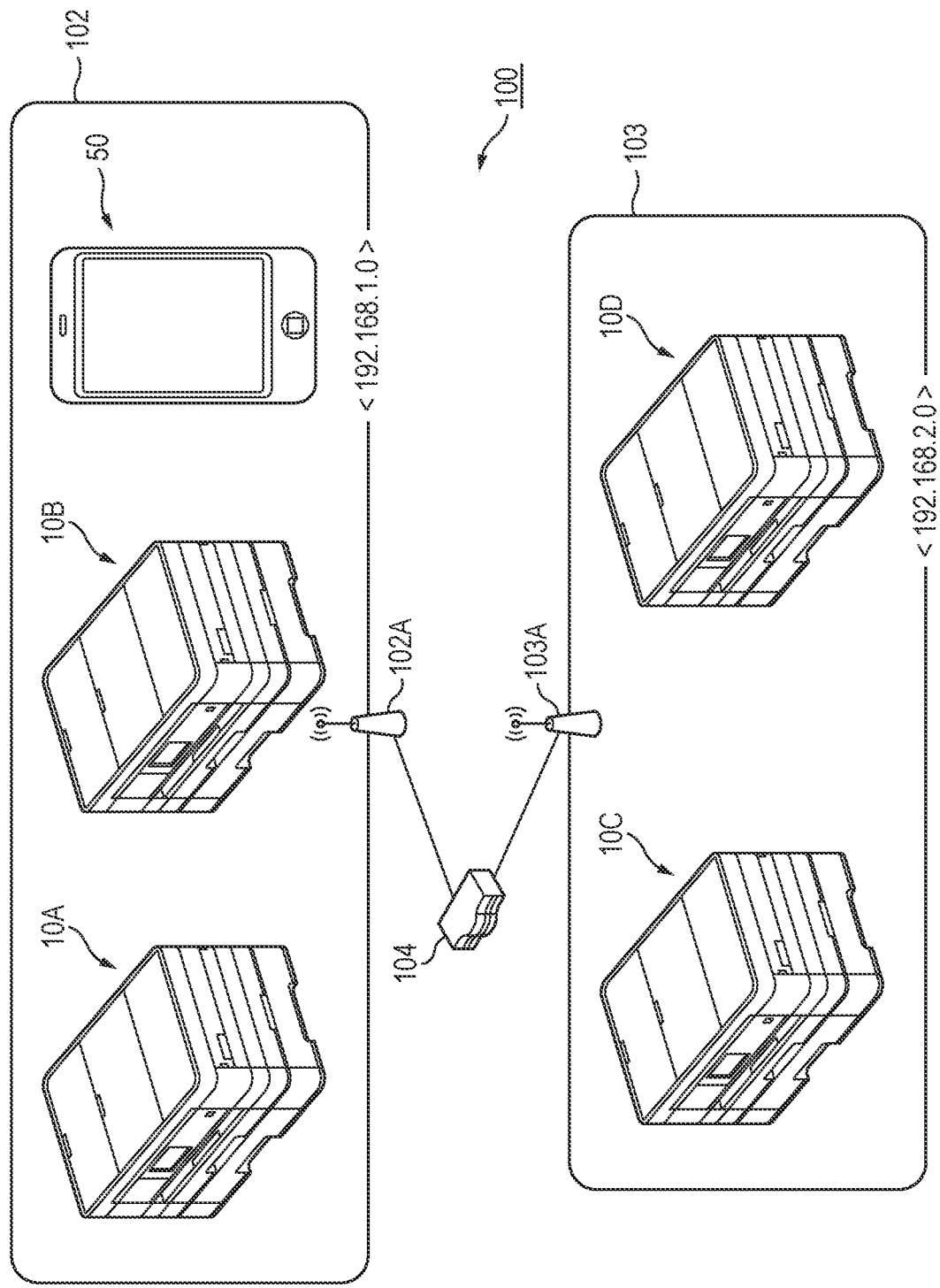

FIG. 3

| APPARATUS ID | HISTORY IP ADDRESS | CONNECTION FLAG | TIME INFORMATION |
|---|---|---|---|
| MFP-A | 192.168.1.160/24 | ON | — |
| MFP-C | 192.168.2.84/24 | OFF | 2017.4.10 17:50 |
| MFP-D | 192.168.2.211/24 | ON | — |

NON-TRANSITORY COMPUTER-READABLE MEDIUM AND PORTABLE TERMINAL

CROSS-REFERENCE TO RELATED APPLICATION

This application is a continuation of U.S. patent application Ser. No. 15/961,988, filed Apr. 25, 2018, which further claims priority from Japanese Patent Application No. 2017-087110 filed on Apr. 26, 2017, the entire subject-matter of both applications are incorporated herein by reference.

TECHNICAL FIELD

The present disclosure relates to a non-transitory computer-readable medium having a program that enables an image processing apparatus to execute an image processing operation, and the portable terminal having a computer that enables to execute the program.

BACKGROUND

There has been disclosed a terminal program of a portable terminal for enabling an image processing apparatus, which can perform communication through a communication network, to execute an image processing operation. More specifically, the related-art terminal program is configured to enable an image processing apparatus designated by a user to execute an image processing operation designated by the user. In the meantime, the image processing operation is a print operation of recording an image on a sheet, a scan operation of reading an image recorded on a document, and the like, for example.

The terminal program described above is configured to broadcast transmission request information for requesting transmission of apparatus information to a communication network, and to cause a user to designate a desired image processing apparatus from image processing apparatuses having transmitted the apparatus information, as a response to the transmission request information. Thereby, it is possible to enable the user to designate the desired image processing apparatus from the image processing apparatuses capable of performing communication.

However, since the broadcast transmission request information cannot go beyond a router, it is not possible to designate an image processing apparatus having a different network address allotted thereto. Also, in a state where the traffic of the communication network is large, the broadcast transmission request information may not arrive at the image processing apparatus or the replied apparatus information may not arrive at the portable terminal. Therefore, if only one method of searching the image processing apparatus is mounted, the image processing apparatus may not be found.

SUMMARY

The specification discloses a non-transitory computer-readable medium having a program that enables to appropriately find an image processing apparatus in a communication network, and the portable terminal having a computer that enables to execute the program.

One illustrative aspect provides a non-transitory computer-readable medium having a program stored thereon and readably by a computer of a portable terminal having a communication interface, an input interface, and a memory, the program, when executed by the computer, causes the portable terminal to perform:

searching an image processing apparatus capable of executing an image processing operation by a first method, in a communication network to which the communication interface is connected;

determining whether the image processing apparatus is detected in the searching by the first method;

searching the image processing apparatus by a second method different from the first method in a case where it is determined that the image processing apparatus is not detected as a result of the searching by the first method;

storing, in the memory, apparatus information for identifying the image processing apparatus detected in the searching by the first method or the searching by the second method, as designated apparatus information; and transmitting operation instruction information for instructing execution of the image processing operation to the image processing apparatus identified with the designated apparatus information stored in the memory, through the communication interface, wherein in one of the searching by the first method and the searching by the second method, the program causes the portable terminal to perform:

broadcasting transmission request information for requesting transmission of the apparatus information to the communication network through the communication interface, and receiving, as a response to the transmission request information transmitted in the broadcasting, the apparatus information from the image processing apparatus through the communication interface, wherein in the other of the searching by the first method and the searching by the second method, the program causes the portable terminal to perform:

receiving a user operation of inputting address information for identifying the image processing apparatus in the communication network, through the input interface, unicasting the transmission request information to the image processing apparatus identified with the address information that is input in the receiving of the user operation, through the communication interface, and receiving, as a response to the transmission request information transmitted in the unicasting, the apparatus information from the image processing apparatus through the communication interface, and wherein the program causes the portable terminal to perform, in the determining whether the image processing apparatus is detected in the searching by the first method, determining whether the apparatus information is received before a first time period elapses since the transmission request information is transmitted in the searching by the first method.

The aspect provides a non-transitory computer-readable medium having a program stored thereon and readably by a computer of a portable terminal having a communication interface and a memory, the program, when executed by the computer, causes the portable terminal to perform:

searching an image processing apparatus capable of executing an image processing operation by a first method, in a communication network to which the communication interface is connected;

determining whether the image processing apparatus is detected in the searching by the first method;

searching the image processing apparatus by a second method different from the first method in a case where it is determined that the image processing apparatus is not detected as a result of the searching by the first method;

storing, in the memory, apparatus information for identifying the image processing apparatus detected in the searching by the first method or the searching by the second method, as designated apparatus information; and transmitting operation instruction information for instructing execution of the image processing operation to the image processing apparatus identified with the designated apparatus information stored in the memory, through the communication interface.

The aspect provides a portable terminal having:
a communication interface;
an input interface;
a memory, and
a controller,
wherein the controller is executable with instructions which, when executed, cause the controller to perform:

searching an image processing apparatus capable of executing an image processing operation by a first method, in a communication network to which the communication interface is connected;

determining whether the image processing apparatus is detected in the searching by the first method;

searching the image processing apparatus by a second method different from the first method in a case where it is determined that the image processing apparatus is not detected as a result of the searching by the first method;

storing, in the memory, apparatus information for identifying the image processing apparatus detected in the searching by the first method or the searching by the second method, as designated apparatus information; and transmitting operation instruction information for instructing execution of the image processing operation to the image processing apparatus identified with the designated apparatus information stored in the memory, through the communication interface, wherein in one of the searching by the first method and the searching by the second method, the controller is executable with instructions which cause the controller to perform:

broadcasting transmission request information for requesting transmission of the apparatus information to the communication network through the communication interface, and receiving, as a response to the transmission request information transmitted in the broadcasting, the apparatus information from the image processing apparatus through the communication interface, wherein in the other of the searching by the first method and the searching by the second method, the controller is executable with instructions which cause the controller to perform:

receiving a user operation of inputting address information for identifying the image processing apparatus in the communication network, through the input interface, unicasting the transmission request information to the image processing apparatus identified with the address information that is input in the receiving of the user operation, through the communication interface, and receiving, as a response to the transmission request information transmitted in the unicasting, the apparatus information from the image processing apparatus through the communication interface, and wherein the controller executable with instructions which cause the controller to perform in the determining whether the image processing apparatus is detected in the searching by the first method, determining whether the apparatus information is received before a first time period elapses since the transmission request information is transmitted in the searching by the first method.

According to the above configuration of the non-transitory computer-readable medium and the portable terminal, in a case where the image processing apparatus cannot be detected by the first method, the image processing apparatus is searched by the second method different from the first method. Therefore, a possibility that the image processing apparatus connected to the communication network can be detected is increased.

As an example, in a case where the image processing apparatus cannot be detected by the broadcasting of the transmission request information, the transmission request information is unicasted to the image processing apparatus identified with the address information designated by the user. Thereby, even when an image processing apparatus having a different network address allotted thereto is designated or even when the traffic of the communication network is large, a possibility that a desired image processing apparatus can be appropriately detected is increased. As another example, in a case where the image processing apparatus identified with the address information designated by the user cannot be detected, the transmission request information is broadcasted to the communication network. Thereby, even when the address information is incorrectly input, a possibility that the image processing apparatus can be appropriately detected is increased.

In the meantime, the term "broadcast" is not limited to the method in which the transmission request information transmitted to the communication network with the broadcast address designated by the portable terminal is transmitted to all the apparatuses in the communication network by the relay apparatus (for example, a switch, a router or the like), and may indicate a method in which the portable terminal sequentially unicasts the transmission request information to all the apparatuses in the communication network.

BRIEF DESCRIPTION OF DRAWINGS

FIG. 1 is a schematic view of a system in accordance with an illustrative embodiment.

FIG. 3 depicts an example of a history list stored in a memory.

DETAILED DESCRIPTION

Hereinafter, an illustrative embodiment of the present disclosure will be described with reference to the drawings.

In the meantime, the illustrative embodiment to be described later is just an example of the present disclosure, and the illustrative embodiment of the present disclosure can be appropriately changed without changing the gist of the present disclosure. For example, an execution sequence of each processing to be described later can be appropriately changed without changing the gist of the present disclosure.

FIG. 1 is a schematic view of a system 100 in accordance with an illustrative embodiment. The system 100 shown in FIG. 1 includes multifunction peripheral products (MFPs) 10A, 10B, 10C, 10D which may also be collectively referred to as "MFP 10" in the below, and a portable terminal 50. The MFP 10 and the portable terminal 50 are configured to perform communication with each other via a communication network. The communication network may be a wired LAN, wireless LANs 102, 103 or a combination thereof, for example. Also, in the illustrative embodiment, processing will be described later on the assumption that a fixed IP address has been already allotted to each apparatus. However, the IP address may be dynamically allotted by a DHCP or the like.

The MFPs 10A, 10B and the portable terminal 50 belong to the wireless LAN 102. That is, the portable terminal 50 can perform wireless communication with the MFPs 10A, 10B via an access point 102A. A network address of the wireless LAN 102 is "192.168.1.0/24". More specifically, it is assumed that an IP address "192.168.1.160" is allotted to the MFP 10A, an IP address "192.168.1.204" is allotted to the MFP 10B, and an IP address "192.168.1.15" is allotted to the portable terminal 50.

Also, the MFPs 10C, 10D belong to the wireless LAN 103. A network address of the wireless LAN 103 is "192.168.2.0/24". More specifically, it is assumed that an IP address "192.168.2.84" is allotted to the MFP 10C and an IP address "192.168.2.211" is allotted to the MFP 10D. That is, the wireless LANs 102, 103 are communication network having different network addresses allotted thereto. Also, the access points 102A, 103A are allotted with different SSIDs.

Also, the access points 102A, 103A are connected to a router 104. That is, the wireless LANs 102, 103 are connected to each other via the router 104. Thereby, the portable terminal 50 can perform wireless communication with the MFPs 10C, 10D via the access point 102A, the router 104 and the access point 103A. Meanwhile, in the illustrative embodiment, the term "wireless communication" is not limited to the configuration where a region between the apparatuses of both ends (for example, the portable terminal 50 and the MFP 10D) is entirely a wireless region, and may indicate a configuration where some regions (for example, between the MFP 10 and the access points 102A, 103A, and between the access points 102A, 103A and the router 104) are wired regions.

Figure 2A:
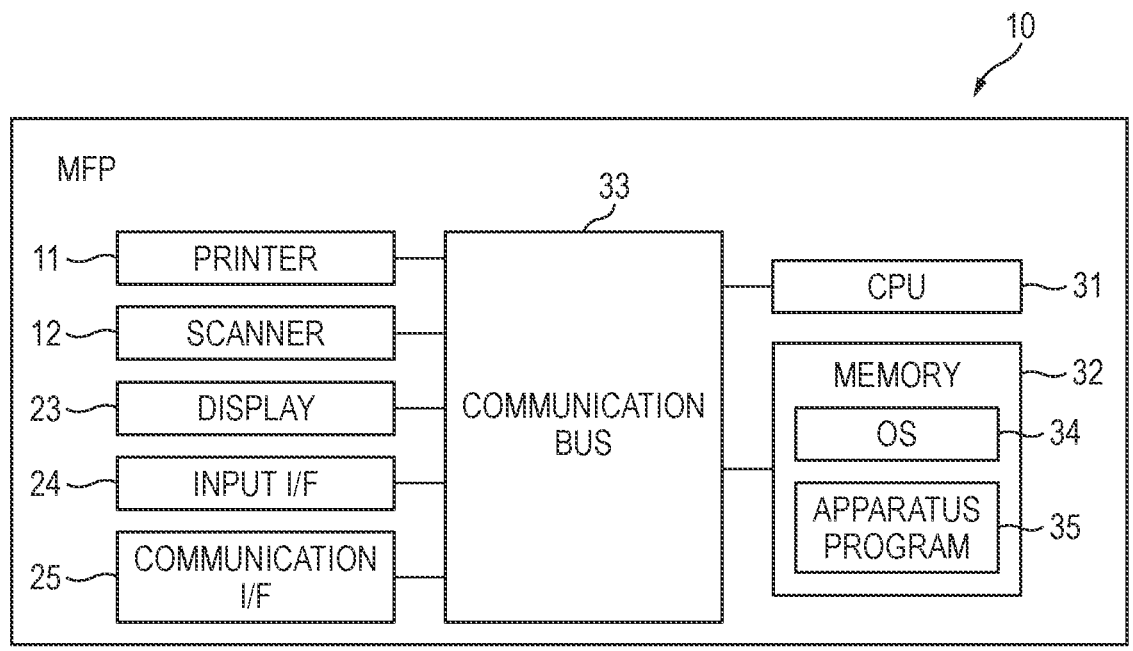
FIG. 2A is a block diagram of an MFP.

As shown in FIG. 2A, the MFP 10 mainly has a printer 11, a scanner 12, a display 23, an input I/F 24, a communication I/F 25, a CPU 31, a memory 32 and a communication bus 33. The respective constitutional elements configuring the MFP 10 are connected to each other through the communication bus 33. The MFP 10 is an example of the image processing apparatus.

The printer 11 is hardware configured to execute a print operation of recording an image expressed by image data onto a sheet. As the recording method of the printer 11, the well-known methods such as an inkjet method and an electrophotographic method may be adopted. The scanner 12 is hardware configured to execute a scan operation of reading an image recorded on a document and generating image data. The print operation and the scan operation are examples of the image processing operation. The MFPs 10A, 10B, 10C, 10D may be configured to executed at least one image processing operation. Also, the image processing operations that can be executed by the MFPs 10A, 10B, 10C, 10D may be different.

The display 23 is a liquid crystal monitor, an organic EL display or the like, and has a display surface for displaying a variety of information.

The input I/F 24 is a user interface configured to receive a user's input operation. Specifically, the input I/F 24 has buttons and is configured to output a variety of operation signals associated with the pushed buttons to the CPU 31. In addition, the input I/F 24 may have a touch sensor having a film shape and superimposed on the display surface of the display 23. An operation of designating an object displayed on the display surface of the display 23 and an operation of inputting a character string or a number string are examples of the user operation. The "object" includes a character string, an icon, a button, a link, a radio button, a check box, a pull-down menu and the like displayed on the display 23, for example.

The input I/F 24 implemented as a touch sensor is configured to output position information indicative of a position on the display surface touched by the user. Meanwhile, in the specification, the "touch" includes all operations of bringing an input medium into contact with the display surface. Also, although the input medium is not in contact with the display surface, "hover" or "floating touch" of bringing the input medium close to a position at which a distance between the input medium and the display surface is very small may be included in the concept of the "touch." Also, the input medium may be a user's finger, a touch pen or the like. A user operation of tapping a position of an object displayed on the display 23 is an example of the user operation of designating the object.

The communication I/F 25 is an interface capable of performing communication with an external apparatus through the communication network. That is, the MFP 10 is configured to transmit a variety of information to the external apparatus through the communication I/F 25 and to receive a variety of information from the external apparatus through the communication I/F 25. Although a specific communication protocol of the communication I/F 25 is not particularly limited, Wi-Fi (registered trademark) can be adopted, for example.

The CPU 31 is configured to control overall operations of the MFP 10. The CPU 31 is configured to acquire and execute a variety of programs (which will be described later) from the memory 32, based on a variety of information output from the input I/F 24 and a variety of information received from the external apparatus through the communication I/F 25. The CPU 31 and the memory 32 configure an example of the controller.

In the memory 32, an OS 34 and an apparatus program 35 are stored. The apparatus program 35 may be a single program or a set of a plurality of programs. Also, in the memory 32, data or information necessary to execute the apparatus program 35 is stored. The memory 32 is configured by a RAM, a ROM, an EEPROM, an HDD, a portable storage medium such as a USB memory to be detachably mounted to the MFP 10, a buffer of the CPU 31 or a combination thereof, for example.

The memory 32 may be a computer-readable storage medium. The computer-readable storage medium is a non-transitory medium. The non-transitory medium includes a recording medium such as a CD-ROM and a DVD-ROM as well as the above-described media. Also, the non-transitory medium is a tangible medium. In the meantime, an electric signal for carrying a program to be downloaded from a server or the like on the Internet is a computer-readable signal medium, which is a kind of the computer-readable medium, but is not included in the non-transitory computer-readable storage medium. This also applies to the memory 62 of the portable terminal 50, which will be described later.

Figure 2B:
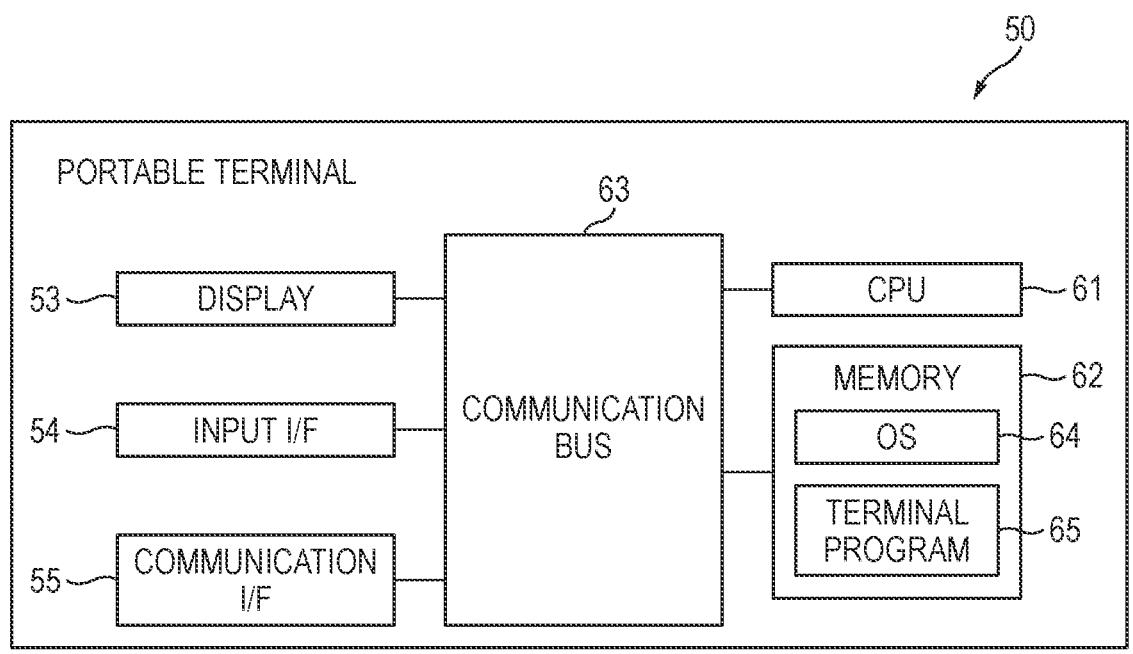
FIG. 2B is a block diagram of a portable terminal.

As shown in FIG. 2B, the portable terminal 50 mainly has a display 53, an input I/F 54, a communication I/F 55, a CPU 61, a memory 62 and a communication bus 63. Since the display 53, the input I/F 54, the communication I/F 55, the CPU 61, the memory 62 and the communication bus 63 included in the portable terminal 50 have the same configurations as the display 23, the input I/F 24, the communication I/F 25, the CPU 31, the memory 32 and the communication bus 33 included in the MFP 10, the descriptions thereof are omitted. The CPU 61 and the memory 62 configure an example of the controller.

The portable terminal 50 is a portable phone, a smart phone, a tablet terminal, or the like, for example. More specifically, the display 53 of the portable terminal 50 preferably has a display screen size of 12 inch or less, and more preferably 8 inch or less. Also, the input I/F 54 of the portable terminal 50 is preferably a touch sensor superimposed on the display surface of the display 53.

In the memory 62, an OS 64 and a terminal program 65 are stored. Also, as shown in FIG. 3, for example, the memory 62 may store therein a history list. The history list includes one or more history records. The history record is registered in the history list by the terminal program 65, in S64 that will be described later. The history record includes an apparatus ID, a history IP address, a connection flag, and time information, for example.

The apparatus ID is an example of the apparatus information for identifying the MFP 10. The apparatus ID may be a MAC address allotted to the communication I/F 25, a model name of the MFP 10, or the like, for example. In the illustrative embodiment, the MFP 10A is identified with an apparatus ID "MFP-A", the MFP 10B is identified with an apparatus ID "MFP-B", the MFP 10C is identified with an apparatus ID "MFP-C", and the MFP 10D is identified with an apparatus ID "MFP-D". The history IP address is an example of the history address information allotted to the MFP 10 identified with the apparatus ID.

The connection flag is information indicating whether the portable terminal is enabled for communication with the MFP 10 identified with the apparatus ID. For the connection flag, a first value "ON" indicating that the portable terminal is enabled for communication with the MFP 10 or a second value "OFF" indicating that the portable terminal is not enabled for communication with the MFP 10 is set. The time information is information indicating time at which the second value "OFF" has been set for the connection flag. That is, the time information is included only in the history record in which the second value "OFF" has been set for the corresponding connection flag.

Also, although not shown, the memory 62 stores therein mode information. The mode information is information indicating whether or not to permit communication with an external apparatus via the communication I/F 55 (hereinafter, also referred to as "Wi-Fi mode"). For the mode information, a third value "ON" indicating that communication with an external apparatus is permitted or a fourth value "OFF" indicating that communication with an external apparatus is not permitted is set. The setting value of the mode information may be switched by a user operation through the input I/F 54 or may be switched by the terminal program 65, for example.

That is, in a case where the third value "ON" is set in the mode information, the communication I/F 55 monitors a beacon signal that is transmitted from the access point 102A, and connects to the access point 102A of a transmission source, in response to receiving the beacon signal. The portable terminal 50 can perform communication with the external apparatus through the communication I/F 55 to which the access point 102A is connected. On the other hand, in a case where the fourth value "OFF" is set in the mode information, the communication I/F 55 does not monitor the beacon signal. That is, the communication I/F 55 is not connected to the access point 102A. As a result, the portable terminal 50 cannot perform communication with the external apparatus through the communication I/F 55.

Also, although not shown, the memory 62 may store therein designated apparatus IDs. The designated apparatus ID is an example of the designated apparatus information for identifying the MFP 10 (hereinafter, referred to as "designated apparatus") designated through the input I/F 54 by the user. That is, the designated apparatus ID is an apparatus ID received from the designated apparatus. Also, although not shown, the memory 62 may be provided with a data folder. In the data folder, photograph data, document data, presentation data, table calculation data and the like may be stored. The diverse data stored in the data folder is data that can be a target of the print operation.

[Operations of System 100]

The operations of the system 100 of the illustrative embodiment are described with reference to FIGS. 4 to 8. Meanwhile, as shown in FIG. 3, it is assumed that the three history records have been registered in the history list, upon start of main processing.

A flowchart of the specification basically indicates processing that is to be executed by the CPUs 31, 61 in accordance with commands described in the program. That is, in the below descriptions, the processing of "determination", "extraction", "selection", "calculation", "decision", "specifying", "control" and the like indicates the processing of the CPUs 31, 61. The processing that is to be executed by the CPUs 31, 61 includes hardware controls through the OSs 34, 64, too. Also, in the specification, "data" is expressed by a bit string that can be read by a computer. The data having substantially the same meaning and the different formats is handled as the same data. This also applies to the "information" of the specification.

[Main Processing]

Figure 4:
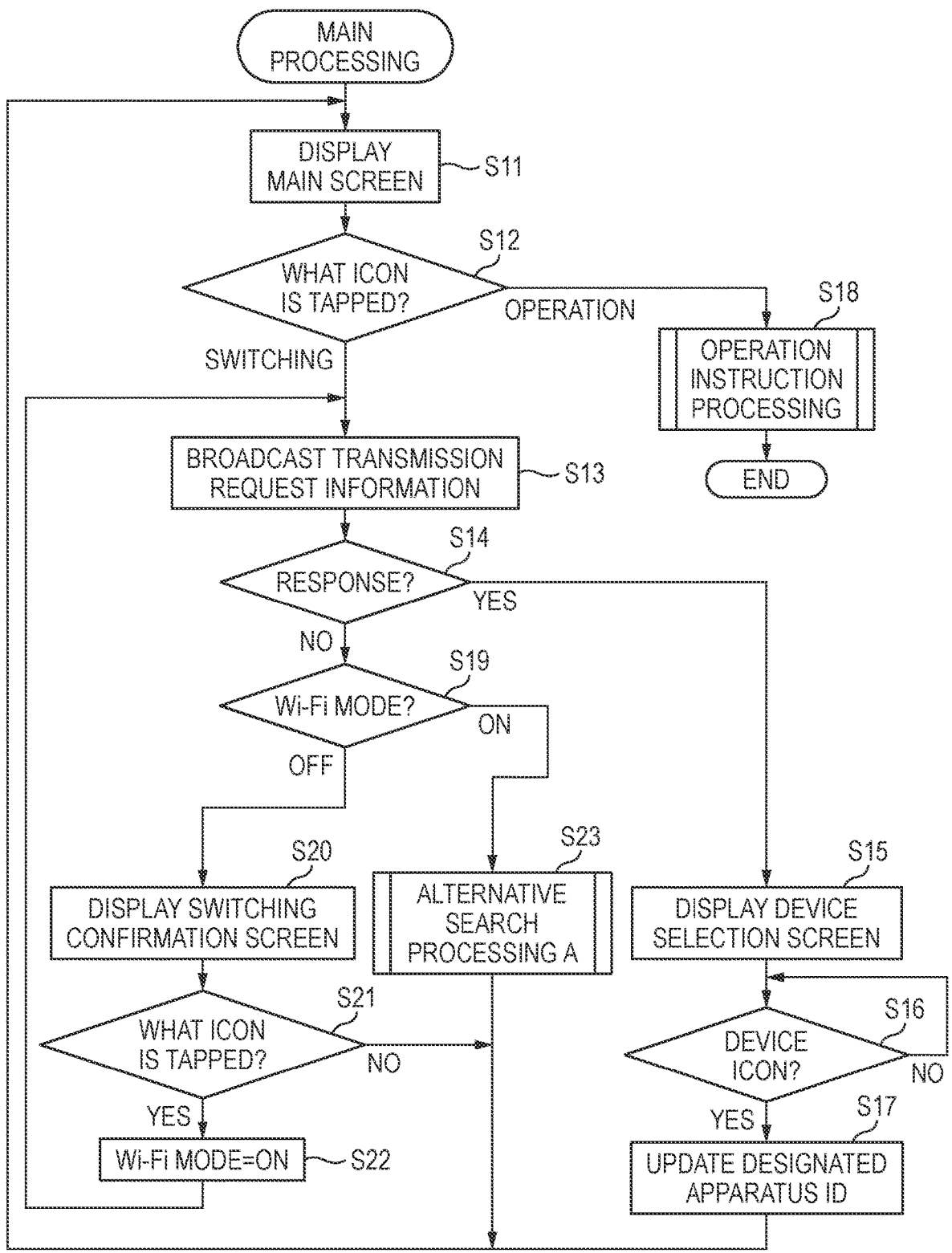
FIG. 4 is a flowchart of main processing.
Figure 5:
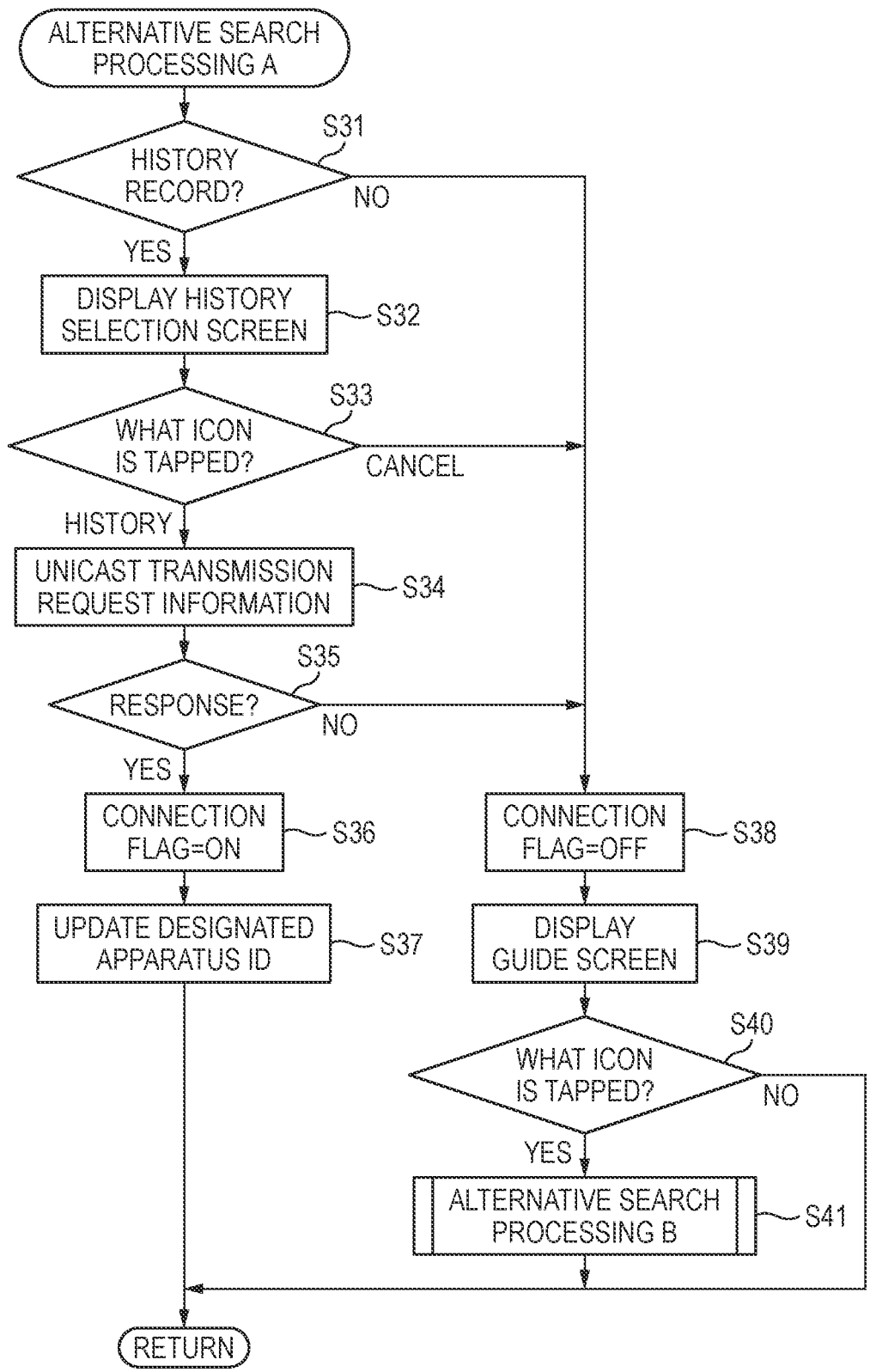
FIG. 5 is a flowchart of alternative search processing A.

First, the terminal program 65 executes main processing shown in FIG. 4, in response to being activated by the user. First, the terminal program 65 displays a main screen shown in FIG. 7A on the display 53 (S11). The main screen includes operation icons 111, 112, and a switching icon 113. The operation icon 111 corresponds to the print operation, and the operation icon 112 corresponds to the scan operation. The switching icon 113 corresponds to an operation of switching the designated apparatus. In a case where the designated apparatus ID is not stored in the memory 62, the switch icon 113 is described thereon with a character string "not selected" indicating that the designated apparatus has not been designated. Then, the terminal program 65 receives a user operation on the main screen through the input I/F 54 (S12).

Then, in a case where a designation of the switch icon 113 is received through the input I/F 54 (S12: switching), for example, the terminal program 65 searches the MFP 10 that can perform communication through the wireless LAN 102 to which the communication I/F 55 is connected (S13). This processing is an example of the first search processing of searching the MFP 10 becoming the designated apparatus by the first method, and is implemented using an SNMP (abbreviation of Simple Network Management Protocol), for example. More specifically, the terminal program 65 broadcasts transmission request information to the wireless LAN 102 through the communication I/F 55. The processing of S13 is an example of the first transmission processing. The terminal program 65 waits for execution of processing of S14 until a first time period elapses since the transmission request information is transmitted in S13.

As an example, the terminal program 65 may set a broadcast address "192.168.1.255" to a destination address of an IP packet including the transmission request information, and transmit the IP packet to the wireless LAN 102. The access point 102A and the router 104 having received the IP packet to which the broadcast address has been set transmit the IP packet to all apparatuses belonging to the wireless LAN 102. At this time, the router 104 does not relay the transmission request information broadcast in the wireless LAN 102 to an apparatus belonging to the wireless LAN 103.

As another example, the terminal program 65 may transmit sequentially a plurality of the transmission request information, in which one of all the IP addresses "192.168.1.1" to "192.168.1.254" in the wireless LAN 102 has been set as a destination address, to the access point 102A through the communication I/F 55. That is, the terminal program 65 may sequentially unicast the transmission request information to all apparatuses belonging to the wireless LAN 102.

In the meantime, although not shown, each apparatus program 35 of the MFPs 10A, 10B receives the transmission request information from the portable terminal 50 through the communication I/F 25. Each apparatus program 35 of the MFPs 10A, 10B transmits the apparatus ID of the own apparatus to the portable terminal 50 through the communication I/F 25, as a response to the transmission request information. At this time, the MFPs 10A, 10B may not receive the transmission request information or the apparatus IDs replied by the MFPs 10A, 10B may not arrive at the portable terminal 50 before the first time period elapses since the transmission request information is transmitted, depending on the traffic of the wireless LAN 102. Also, the MFPs 10C, 10D belonging to the wireless LAN 103 do not receive the transmission request information transmitted in S13.

Then, the terminal program 65 receives the apparatus IDs transmitted as a response to the transmission request information, from the MFPs 10A, 10B through the communication I/F 55. Then, the terminal program 65 temporarily stores the received apparatus IDs in the memory 62 in association with transmission source addresses of the IP packets including the apparatus IDs (i.e., the IP address of the MFP 10, which is a transmission source of the apparatus ID). This processing is an example of the first receiving processing.

However, as described above, the terminal program 65 may receive the apparatus IDs from all of the MFPs 10A, 10B, may receive the apparatus ID from only one of the MFPs 10A, 10B, or may not receive the apparatus IDs from all of the MFPs 10A, 10B. In a case where the first time period elapses since the transmission request information is transmitted, the terminal program 65 determines whether one or more apparatus IDs have been received (S14). The receiving of the apparatus ID before the first time period elapses is an example of the detection of the MFP 10 identified with the apparatus ID. The processing of S14 is an example of the first determination processing.

Figure 7A:
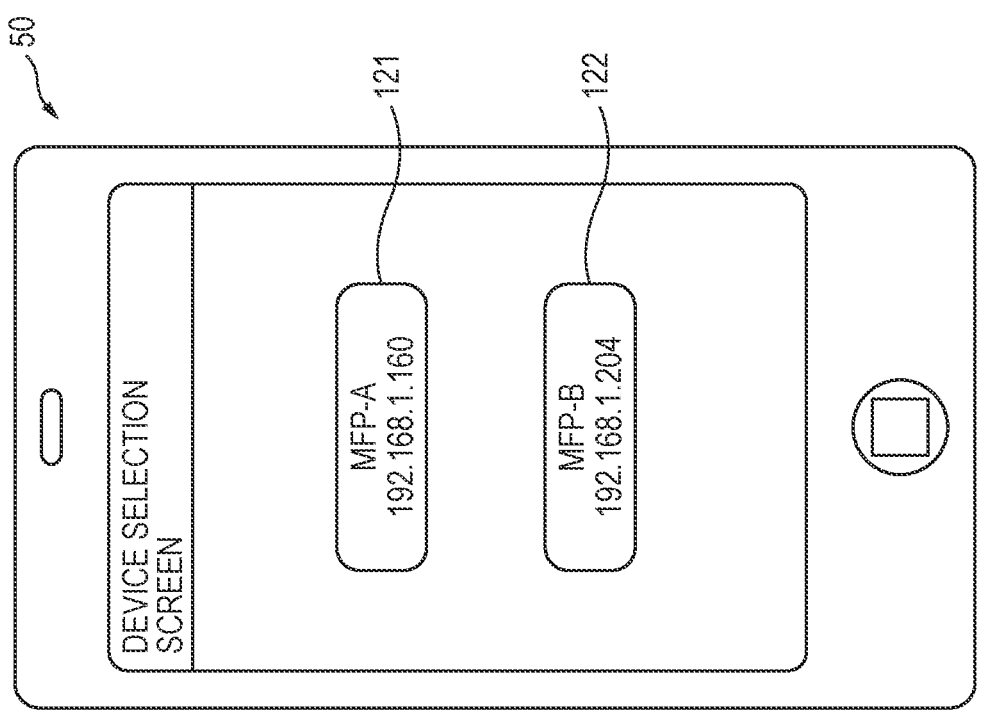
FIG. 7A depicts an example of a main screen on a display.
Figure 7B:
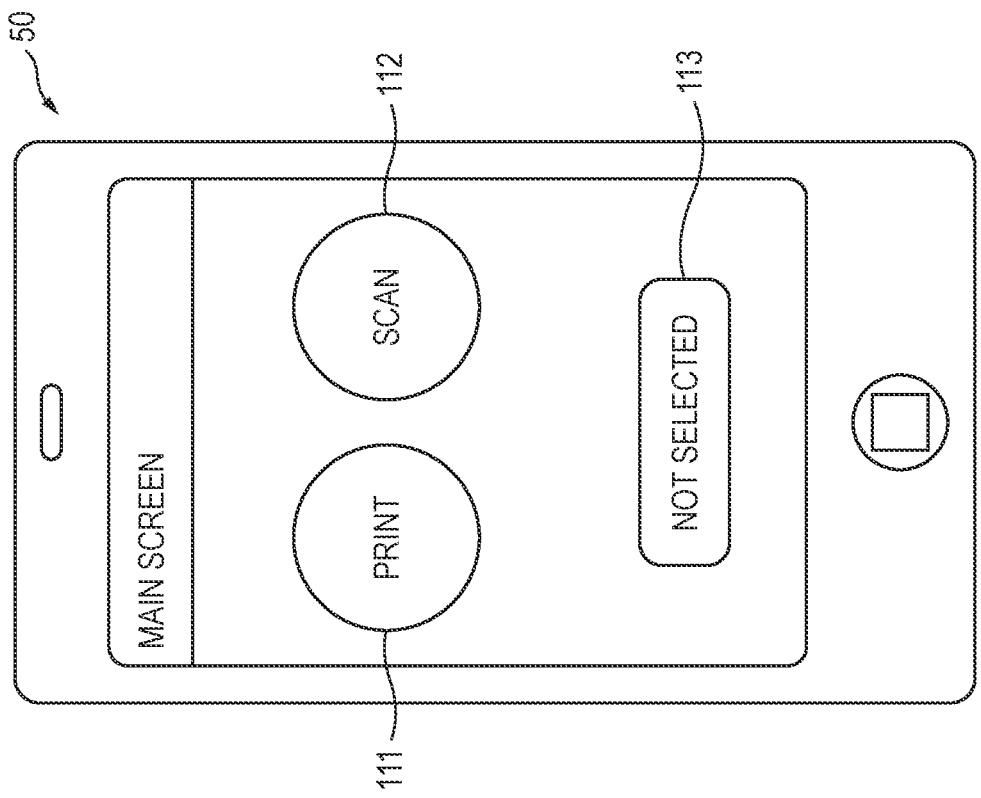
FIG. 7B depicts an example of a device selection screen on the display.
Figure 8A:
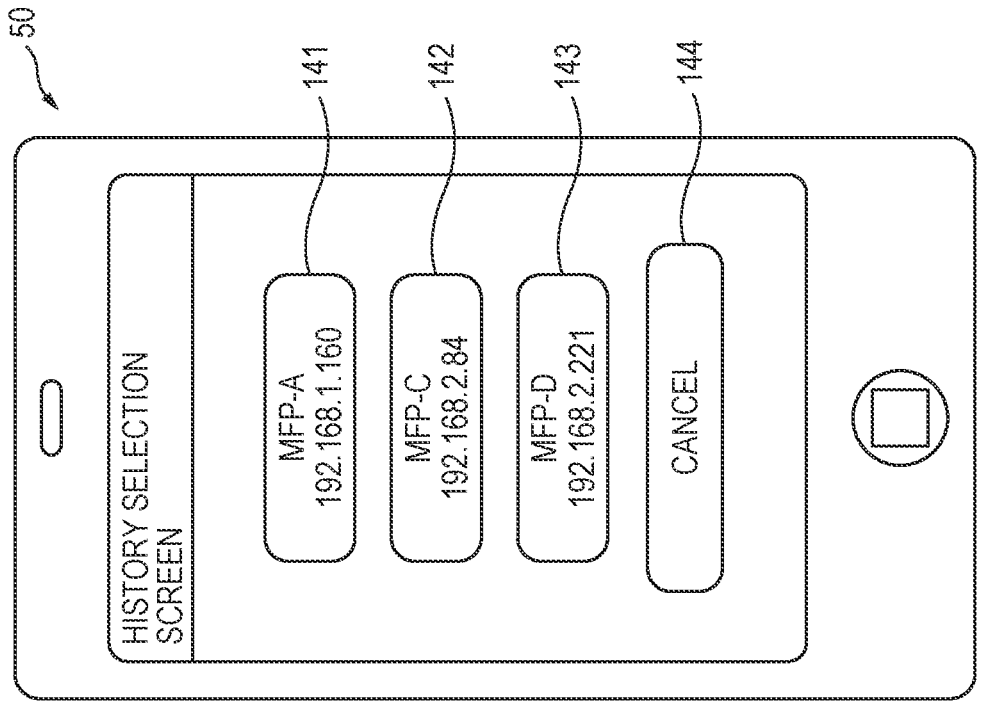
FIG. 8A depicts an example of a switching confirmation screen on the display.
Figure 8B:
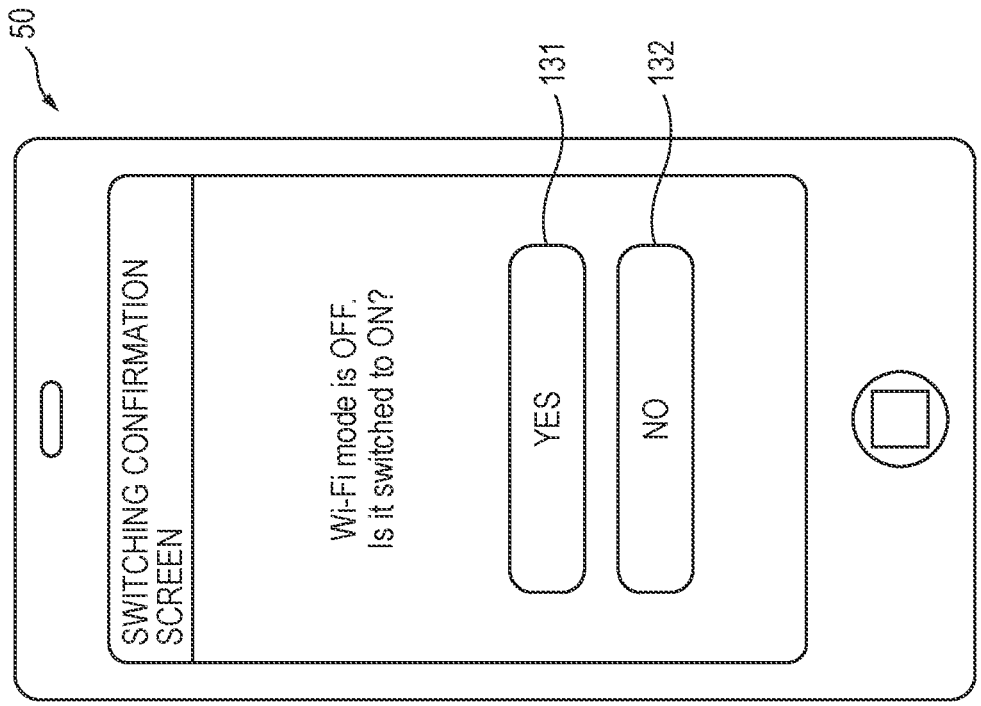
FIG. 8B depicts an example of a history selection screen on the display.

Then, in a case where it is determined that one or more apparatus IDs have been received (S14: Yes), the terminal program 65 displays a device selection screen shown in FIG. 7B on the display 53 (S15). FIG. 7B depicts a device selection screen that is displayed in a case where the apparatus IDs are received from all of the MFPs 10A, 10B. The device selection screen includes device icons 121, 122. Each of the device icons 121, 122 corresponds to one of sets of the apparatus IDs and the IP addresses temporarily stored in the memory 62. In each of the device icons 121, 122, an apparatus ID and an IP address corresponding thereto are described. The terminal program 65 receives a user operation on the device selection screen through the input I/F 54 (S16).

Then, in a case where a designation of the device icon 121 is received through the input I/F 54 (S16: Yes), for example, the terminal program 65 stores the apparatus ID "MFP-A" corresponding to the designated device icon 121 in the memory 62, as the designated apparatus ID (S17). In the meantime, in case the designated apparatus ID has been already stored in the memory 62, the terminal program 65 overwrites the designated apparatus ID with a new designated apparatus ID. The processing of S17 is an example of the first storing processing. The terminal program 65 again executes the processing of S11 and thereafter. The main screen that is here displayed is different from FIG. 7A, in that the designated apparatus ID "MFP-A" is described on the switching icon 113.

On the other hand, in a case where it is determined that the apparatus ID has not been received before the first time period has elapsed since the transmission request information is transmitted in S13 (S14: No), the terminal program 65 determines the setting value of the mode information (S19). The processing of S19 is an example of the fifth determination processing. In a case where it is determined that the fourth value "OFF" is set in the mode information (S19: OFF), the terminal program 65 displays a switching confirmation screen shown in FIG. 8A on the display 53 (S20). The switching confirmation screen includes a message "Wi-Fi mode is OFF. Is it switched to ON?", a [Yes] icon 131, and a [No] icon 132. Then, the terminal program 65 receives a user operation on the switching confirmation screen through the input I/F 54 (S21).

In a case where a designation of the [Yes] icon 131 is received through the input I/F 54 (S21: Yes), the terminal program 65 sets the third value "ON" in the mode information stored in the memory 62 (S22). The processing of S22 is an example of the switching processing of switching the setting value of the mode information from the fourth value "OFF" to the third value "ON". Then, the terminal program 65 again executes the processing of S13 and thereafter. On the other hand, in a case where a designation of the [No] icon 132 is received through the input I/F 54 (S21: No), the terminal program 65 again executes the processing of S11 and thereafter without executing the processing of S22.

Also, in a case where it is determined that the third value "ON" is set in the mode information (S19: ON), the terminal program 65 executes alternative search processing A (S23). The alternative search processing A is processing of searching the MFP 10 by a method different from the first search processing. The alternative search processing A is described in detail with reference to FIG. 5.

[Alternative Search Processing A]

First, the terminal program 65 determines whether the history record is recorded in the history list (S31). The processing of S31 is an example of the second determination processing. Then, in a case where it is determined that the history record is recorded in the history list (S31: Yes), the terminal program 65 displays a history selection screen shown in FIG. 8B on the display 53 (S32). Then, the terminal program 65 receives a user operation on the history selection screen through the input I/F 54 (S33). The processing of S33 is an example of the third reception processing.

The history selection screen includes history icons 141, 142, 143, and a [cancel] icon 144. Each of the history icons 141 to 143 corresponds to one of the plurality of history records recorded in the history list. On each of the history icons 141 to 143, an apparatus ID and a history IP address included in the corresponding history record are described. The [cancel] icon 144 corresponds to an instruction not to select the history record.

Then, in a case where a designation of the history icon 142 is received through the input I/F 54 (S33: history), for example, the terminal program 65 reads out a history record corresponding to the designated history icon 142 from the history list. Then, the terminal program 65 transmits the transmission request information, in which the history IP address "192.168.2.84" of the read history record is set as a destination address, to the access point 102A through the communication I/F 55 (S34). The transmission request information is relayed to the MFP 10C by the access point 102A, the router 104 and the access point 103A. That is, the terminal program 65 unicasts the transmission request information to the MFP 10C identified with the history IP address. The processing of S34 is an example of the fourth transmission processing.

Then, the terminal program 65 waits for execution of processing of S35 until a third time period elapses since the transmission request information is transmitted in S34. The third time period is a predetermined time period longer than the first time period. Then, the terminal program 65 receives the apparatus ID "MFP-C" from the MFP 10C through the communication I/F 55, as a response to the transmission request information transmitted in S34 (S35). The processing of S35 is an example of the fourth receiving processing, and the processing of S32 to S35 is an example of the third search processing of searching the MFP 10 by the third method.

Then, in a case where the apparatus ID "MFP-C" is received from the MFP 10C (S35: Yes), the terminal program 65 sets the first value "ON" for the connection flag of the history record read out from the history list (S36). Also, the terminal program 65 stores the apparatus ID "MFP-C" received in S35 in the memory 62, as the designated apparatus ID (S37). The processing of S36 is an example of the first setting processing, and the processing of S37 is an example of the first storing processing. Then, the terminal program 65 returns to S11 of FIG. 4, and displays the main screen, in which the designated apparatus ID "MFP-C" is described on the switching icon 113, on the display 53.

On the other hand, in a case where it is determined that the history record is not recorded in the history list (S31: No), in a case where a designation of the [cancel] icon 144 of the history selection screen is received through the input I/F 54 (S33: Cancel) or in a case where the apparatus ID "MFP-C" is not received from the MFP 10C before the third time period has elapsed since the transmission request information is transmitted in S34 (S35: No), the terminal program 65 sets the second value "OFF" for the connection flag of the history record read out from the history list (S38). Also, the terminal program 65 acquires the time information indicative of the current time from a system clock (not shown) and sets the current time in the history record. The processing of S38 is an example of the second setting processing.

Figure 9B:
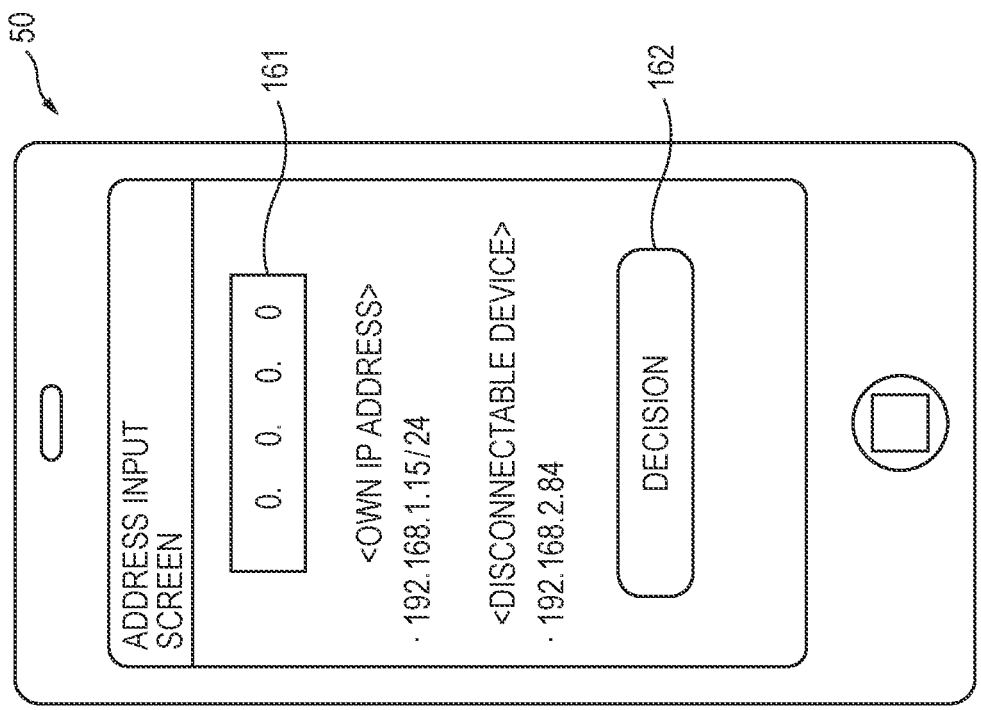
FIG. 9B depicts an example of an address input screen on the display.
Figure 9A:
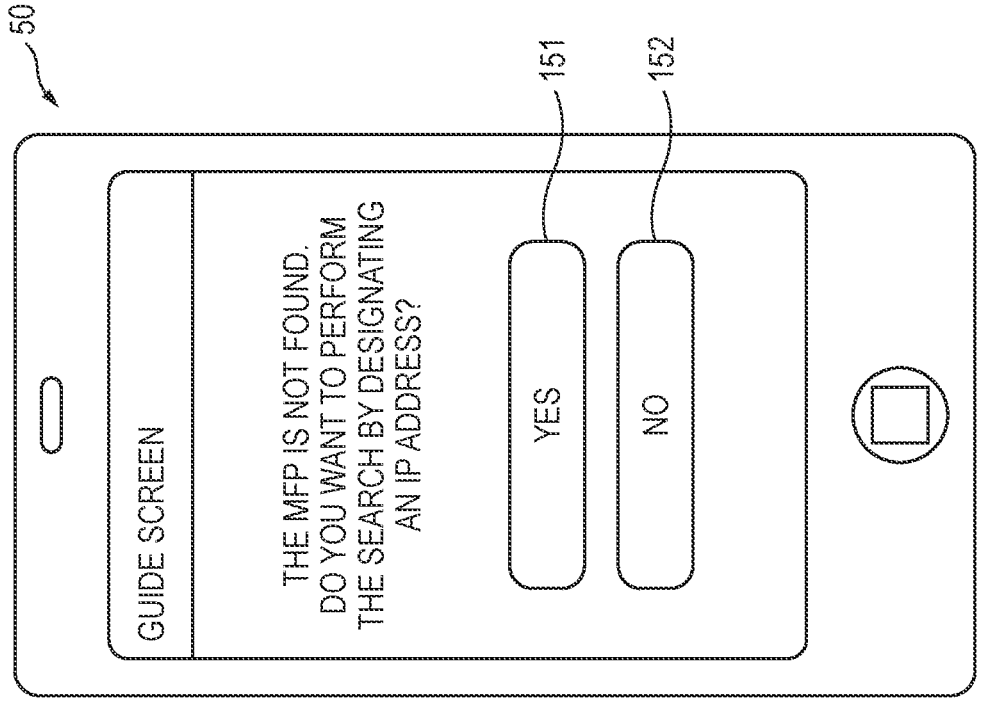
FIG. 9A depicts an example of a guide screen on the display.

Then, the terminal program 65 displays a guide screen shown in FIG. 9A on the display 53 (S39). The guide screen is an example of the first screen including a message "MFP is not found. Do you want to perform the search by designating an IP address?", a [Yes] icon 151, which is an example of the first object, and a [No] icon 152, which is an example of the second object. The message of the guide screen is an example of the message for urging the user to input an IP address, and the specific phrase is not limited thereto. Then, the terminal program 65 receives a user operation on the guide screen through the input I/F 54 (S40). The processing of S39 is an example of the first display processing, and the processing of S40 is an example of the second reception processing.

Then, in a case where a designation of the [Yes] icon 151 is received through the input I/F 54 (S40: Yes), the terminal program 65 executes alternative search processing B (S41). On the other hand, in a case where a designation of the [No] icon 152 is received through the input I/F 54 (S40: No), the terminal program 65 returns to S11 of FIG. 4 and displays the main screen on the display 53, without executing the processing of S41. The alternative search processing B is processing of searching the MFP 10 by a method different from the first search processing and the third search processing. The alternative search processing B is described in detail with reference to FIG. 6.

[Alternative Search Processing B]

First, the terminal program 65 displays an address input screen shown in FIG. 9B on the display 53 (S51). The address input screen is an example of the second screen including a text box 161 in which an IP address input by the user is to be displayed, an own IP address "192.168.1.15/24", a disconnectable device "192.168.2.84", and a [Decision] icon 162. The own IP address indicates an IP address allotted to the communication I/F 55. The disconnectable device indicates a history IP address of the history record in which the first value "OFF" is set for the connection flag. Then, the terminal program 65 receives a user operation on the address input screen through the input I/F 54 (S52). The processing of S51 is an example of the second display processing, and the processing of S52 is an example of the first reception processing.

The terminal program 65 displays an IP address (hereinafter, referred to as "input IP address") input through a software keyboard (not shown), for example, in the text box 161. Also, in a case where a designation of the [Decision] icon 162 is received through the input I/F 54 (S52: Yes), the terminal program 65 temporarily stores, in the memory 62, the input IP address displayed in the text box 161. Then, the terminal program 65 determines whether the second value "OFF" is set for the connection flag of the history record including the input IP address, as the history IP address (S53). The processing of S53 is an example of the third determination processing.

As an example, in a case where the IP address "192.168.2.84" is input and the designation of the [Decision] icon 162 is received through the input I/F 54 (S52: Yes), the terminal program 65 determines that the second value "OFF" is set for the connection flag of the history record including the input IP address, as the history IP address (S53: Yes). In this case, the terminal program 65 calculates an elapse time from the time "2017.4.10 17:50" indicated by the time information of the history record including the IP address "192.168.2.84" to the current time indicated by the time information acquired from the system clock (not shown). Then, the terminal program 65 determines whether the calculated elapse time is a preset threshold time (for example, one hour, 24 hours or the like) or longer (S54). The processing of S54 is an example of the fourth determination processing.

Figure 10B:
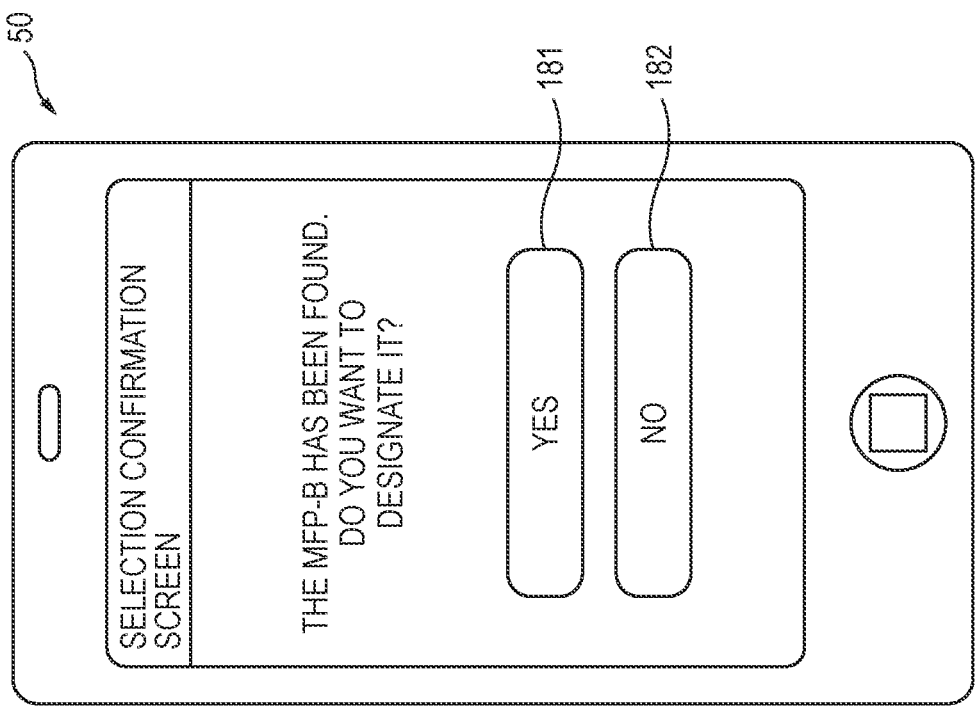
FIG. 10B depicts an example of a selection confirmation screen on the display.
Figure 10A:
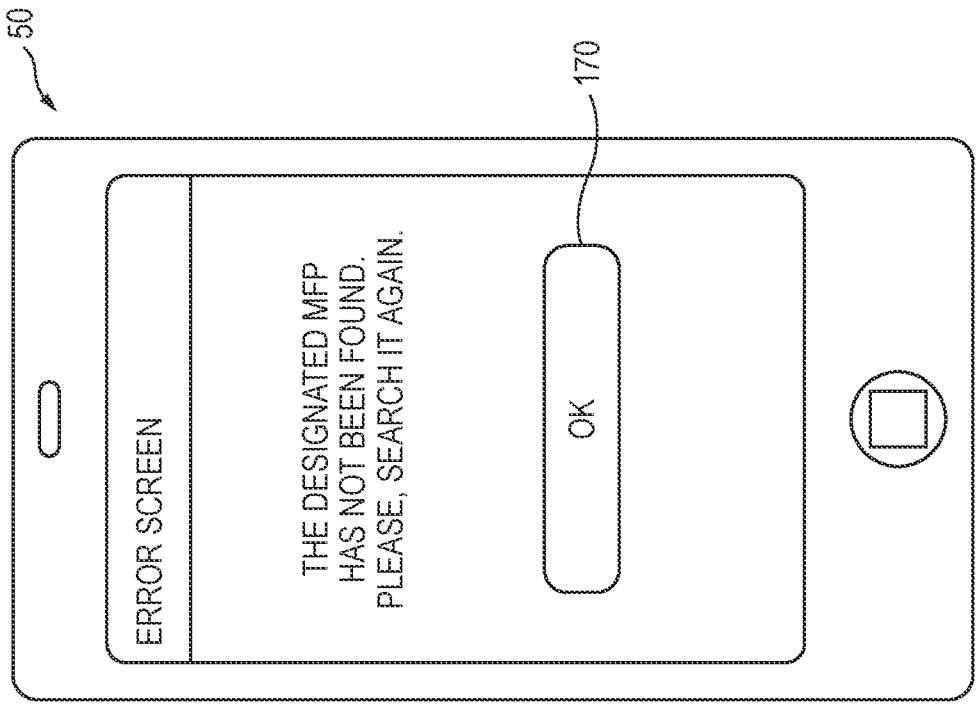
FIG. 10A depicts an example of an error screen on the display.

Then, in a case where it is determined that the calculated elapse time is shorter than the threshold time (S54: No), the terminal program 65 displays an error screen shown in FIG. 10A on the display 53 without executing processing of S57 and thereafter (S55). The error screen includes a message "The designated MFP has not been found. Please, search it again" and an [OK] icon 170. Then, the terminal program 65 receives a user operation on the error screen through the input I/F 54 (S56).

Then, in a case where a designation of the [OK] icon 170 is received through the input I/F 54 (S56: Yes), the terminal program 65 again executes the processing of S51 and thereafter. On the other hand, in a case where it is determined that the elapse time is equal to or longer than the threshold time (S54: No), the terminal program 65 executes processing of S57 and thereafter, which will be described later, by using the input IP address "192.168.2.84".

As another example, in a case where the IP address "192.168.2.160" is input and the designation of the [Decision] icon 162 is received through the input I/F 54 (S52: Yes), the terminal program 65 determines that the first value "ON" is set for the connection flag of the history record including the input IP address, as the history IP address (S53: No), and executes processing of S57 and thereafter.

As another example, in a case where the IP address "192.168.1.104" is input through the input I/F 54 (S52: Yes), the terminal program 65 determines that the history record including the input IP address, as the history IP address, is not registered in the history list (S53: No), and executes processing of S57 and thereafter.

Then, the terminal program 65 transmits the transmission request information, in which the input IP address (for example, 192.168.1.204) input and received in S52 is set as a destination address, to the access point 102A through the communication I/F 55 (S57). The transmission request information is relayed to the MFP 10B through the access point 102A. That is, the terminal program 65 unicasts the transmission request information to the MFP 10B identified with the input IP address. The processing of S57 is an example of the second transmission processing.

Then, the terminal program 65 waits for execution of processing of S58 until a second time period elapses since the transmission request information is transmitted in S57. The second time period is a preset time period longer than the first time period. Also, the second time period may be the same as the third time period. Then, the terminal program 65 receives the apparatus ID "MFP-B" from the MFP 10B through the communication I/F 55, as a response to the transmission request information transmitted in S57 (S58). The processing of S58 is an example of the second receiving processing, and the processing of S51 to S58 is an example of the second search processing of searching the MFP 10 by the second method. In a case where the apparatus ID "MFP-B" is received before the second time period elapses (S58: Yes), the terminal program 65 executes processing of S63 and thereafter, without executing the processing of S59 to S62.

More specifically, the terminal program 65 stores, in the memory 62, the apparatus ID "MFP-B" received in S58, as the designated apparatus ID (S63). Also, the terminal program 65 registers a new history record in the history list (S64). The history record registered in S64 includes the apparatus ID "MFP-B" received in S58, the transmission source IP address "192.168.1.204" of the IP packet including the apparatus ID "MFP-B", as the history IP address, and the connection flag for which the first value "ON" is set. The processing of S63 is an example of the first storing processing, and the processing of S64 is an example of the second storing processing. Then, the terminal program 65 returns to S11 of FIG. 4, and displays, on the display 53, the main screen in which the designated apparatus ID "MFP-B" is described on the switching icon 113.

On the other hand, in a case where the apparatus ID "MFP-B" is not received before the second time period elapses since the transmission request information is transmitted in S57 (S58: No), the terminal program 65 multicasts the transmission request information to the communication network (i.e., the wireless LAN 102) to which the input IP address "192.168.1.204" belongs, through the communication I/F 55 (S59). The processing of S59 is an example of the third transmission processing. Then, the terminal program 65 waits for execution of processing of S60 until the first time period elapses since the transmission request information is transmitted in S59. The processing of S60 is an example of the third receiving processing.

Then, in a case where the apparatus ID "MFP-B" is received from the MFP 10B through the communication I/F 55, as a response to the transmission request information transmitted in S59 (S60: Yes), for example, the terminal program 65 displays a selection confirmation screen shown in FIG. 10B on the display 53 (S61). The selection confirmation screen includes a message "The MFP-B has been found. Do you want to designate it?", a [Yes] icon 181 and a [No] icon 182. Then, the terminal program 65 receives a user operation on the selection confirmation screen, through the input I/F 54.

Then, in a case where a designation of the [Yes] icon 181 is received through the input I/F 54 (S62: Yes), the terminal program 65 executes processing of S63 and thereafter. On the other hand, in a case where the apparatus ID is not received before the first time period elapses since the transmission request information is transmitted in S59 (S60: No), or in a case where a designation of the [No] icon 182 on the selection confirmation screen is received through the input I/F 54 (S62: No), the terminal program 65 again executes the processing of S11 and thereafter, without executing processing of S63 and S64. Meanwhile, in S60, the apparatus ID is not always received from the MFP 10B identified with the input IP address. Also, in a case where a plurality of the apparatus IDs is received in S60, one of the plurality of received apparatus IDs may be selected by the user.

Returning to FIG. 4, in a case where a designation of the operation icon 111 is received through the input I/F 54 (S12: Operation) at a state where the designated apparatus ID is stored in the memory 62, the terminal program 65 executes operation instruction processing of enabling the designated apparatus to execute a print operation corresponding to the operation icon 111 (S18). Although a flowchart of the operation instruction processing of instructing the print operation is not shown, following processing is executed, for example.

First, the terminal program 65 receives a user operation of designating one (hereinafter, referred to as "designated data") of the plurality of data stored in the data folder of the memory 62, through the input I/F 54. Also, the terminal program 65 may receive a user operation of designating execution conditions (for example, a sheet size, an image quality and the like) of the print operation, through the input I/F 54, or may display, on the display 53, a preview screen for expressing a state where an image expressed by the designated data is recorded on a sheet. Then, the terminal program 65 transmits print instruction information to the designated apparatus through the communication I/F 55. The print instruction information is an example of the operation instruction information for instructing execution of the print operation of printing the designated data. The print instruction information includes the designated data, and condition information indicative of the execution conditions designated by the user, for example.

In the meantime, the apparatus program 35 of the MFP 10 receives the print instruction information from the portable terminal 50 through the communication I/F 25. Then, the apparatus program 35 enables the printer 11 to execute the print operation, in accordance with the received print instruction information. That is, the printer 11 records an image, which is expressed by the designated data included in the print instruction information, on the sheet in accordance with the execution condition indicated by the condition information.

Also, in a case where a designation of the operation icon 112 is received through the input I/F 54 at a state where the designated apparatus ID is stored in the memory 62 (S12: Operation), the terminal program 65 executes operation instruction processing of enabling the designated apparatus to execute a scan operation corresponding to the operation icon 112 (S18). Although a flowchart of the operation instruction processing of instructing the scan operation is omitted, following processing is executed, for example.

First, the terminal program 65 receives a user operation of designating execution conditions (for example, a reading resolution, a storing destination of scan data, and the like) of the scan operation, through the input I/F 54. Then, the terminal program 65 transmits scan instruction information to the designated apparatus through the communication I/F 55. The scan instruction information is an example of the operation instruction information for instructing execution of the scan operation. The scan instruction information includes condition information indicative of the execution conditions designated by the user, for example.

In the meantime, although not shown, the apparatus program 35 of the MFP 10 receives the scan instruction information from the portable terminal 50 through the communication I/F 25. Then, the apparatus program 35 enables the scanner 12 to execute the scan operation, in accordance with the received scan instruction information. That is, the scanner 12 scans a document set on an ADF or contact glass (not shown) with the reading resolution indicated by the scan instruction information, and generates scan data. Then, the apparatus program 35 stores the scan data generated by the scanner 12 in a storing destination (for example, a USB memory, the portable terminal 50 or the like) indicated by the scan instruction information.

[Operational Effects of Illustrative Embodiment]

According to the above illustrative embodiment, in a case where the MFP 10 is not detected by the first search processing (S13), the MFP 10 is searched by the second search processing (S51 to S58) different from the first search processing. That is, in a case where the MFP 10 is not detected by the broadcast of the transmission request information, the transmission request information is unicasted to the MFP 10 identified with the IP address designated through the address input screen by the user. Thereby, even when the MFPs 10C, 10D having different network addresses allotted thereto are designated or even when the traffic of the wireless LAN 102 is large, the possibility that the desired MFP 10 can be appropriately detected is increased.

Also, according to the above illustrative embodiment, in a case where the MFP 10 is not detected by the second search processing, the transmission request information is broadcasted to the communication network including the input IP address. Thereby, even when an IP address is incorrectly input through the address input screen, the possibility that the desired MFP 10 can be detected is increased. In the meantime, the present disclosure is not limited to the configuration where the transmission request information is broadcasted in S59. As another example, the terminal program 65 may transmit (i.e., multicast) the transmission request information to each of apparatuses identified with IP addresses in which the numerical value of the lowest digit of the input IP address is replaced with 0 to 9.

Also, according to the above illustrative embodiment, since the standby time period in S35 and S58 is set longer than the standby time period in S14, it is possible to increase the probability that the MFP 10 can be detected in the second detection processing and the third detection processing, as compared to the first detection processing. In the meantime, in a case where the apparatus ID is not received before the predetermined standby time period elapses in S14, S35, S58, S60, the terminal program 65 may retransmit the transmission request information (i.e., retry the processing of S13, S34, S57, S59). The terminal program 65 may be configured to set the number of retries in S35 and S58 greater than that in S14 and S60. That is, the terminal program 65 may be configured to make at least one of the standby time period and the number of retries in S35 and S58 different that in S14 and S60.

Also, according to the above illustrative embodiment, in a case where the MFP 10 is not detected in the first search processing, the third search processing in which the history list is used is executed earlier than the second search processing. Thereby, even when the IP address input in the previous processing of S52 is not again input, it is possible to detect the MFP 10 identified with the IP address. That is, it is possible to reduce a user's burden on the input of the IP address of the desired MFP 10. In the meantime, the registration of the history record is not limited to timing at which the designated apparatus is designated in the second search processing, and may be performed at timing at which the designated apparatus is designated in the first search processing.

Also, according to the above illustrative embodiment, in a case where the MFP 10 is not detected in the first search processing, it is possible to enable the user to recognize the possibility that the MFP 10 can be detected by inputting the IP address, through the guide screen. As a result, the detection possibility of the MFP 10 is further increased. Also, since the IP address allotted to the portable terminal 50 and the IP address of the MFP 10, which was not detected in the previous third search processing, are notified to the user through the address input screen, the possibility that the MFP 10 will be detected by the second search processing is further increased.

Also, the MFP 10 in which the threshold time has not elapsed since the second value "OFF" has been set for the connection flag may not respond even when the transmission request information is again unicast thereto in S57. On the other hand, the MFP 10 in which the threshold time has elapsed since the second value "OFF" has been set for the connection flag may be in a state where it can transmit the apparatus ID. Therefore, like the above illustrative embodiment, it is preferably determined whether or not to unicast the transmission request information to the MFP 10 identified with the history IP address, on the basis of the elapse time after the second value "OFF" has been set for the connection flag (S54).

Also, according to the above illustrative embodiment, in a case where the fourth value "OFF" is set in the mode information, the mode information is switched to the third value "ON" and the first search processing is then retried. Therefore, the detection possibility of the MFP 10 is further increased. In the meantime, the execution timing of the processing of S19 to S22 is not limited to the above example. As another example, the terminal program 65 may execute the processing of S19 to S22 earlier than the processing of S13.

Also, the processing that is executed in a case where the fourth value "OFF" is set in the mode information is not limited to the above example. As another example, in a case where the [Yes] icon 131 is designated in S21, the terminal program 65 may execute the processing of S22 and the alternative search processing A (S23). In this case, the processing of S22 is preferably executed earlier than the processing of S57, and the order of the processing of S51 and S52 is not limited. Thereby, the detection possibility of the MFP 10 by the second search processing is further increased.

Figure 6:
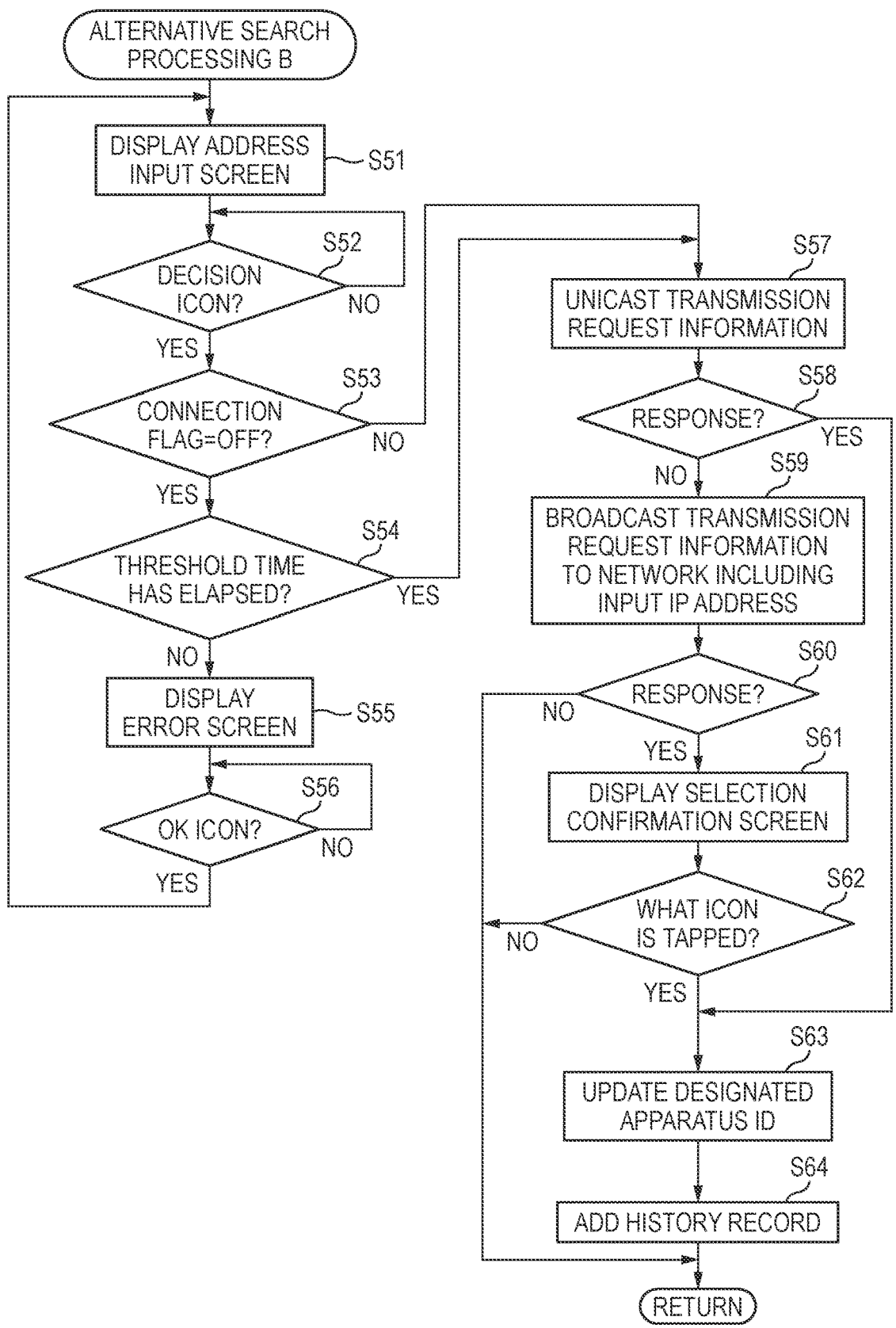
FIG. 6 is a flowchart of alternative search processing B.
Figure 11:
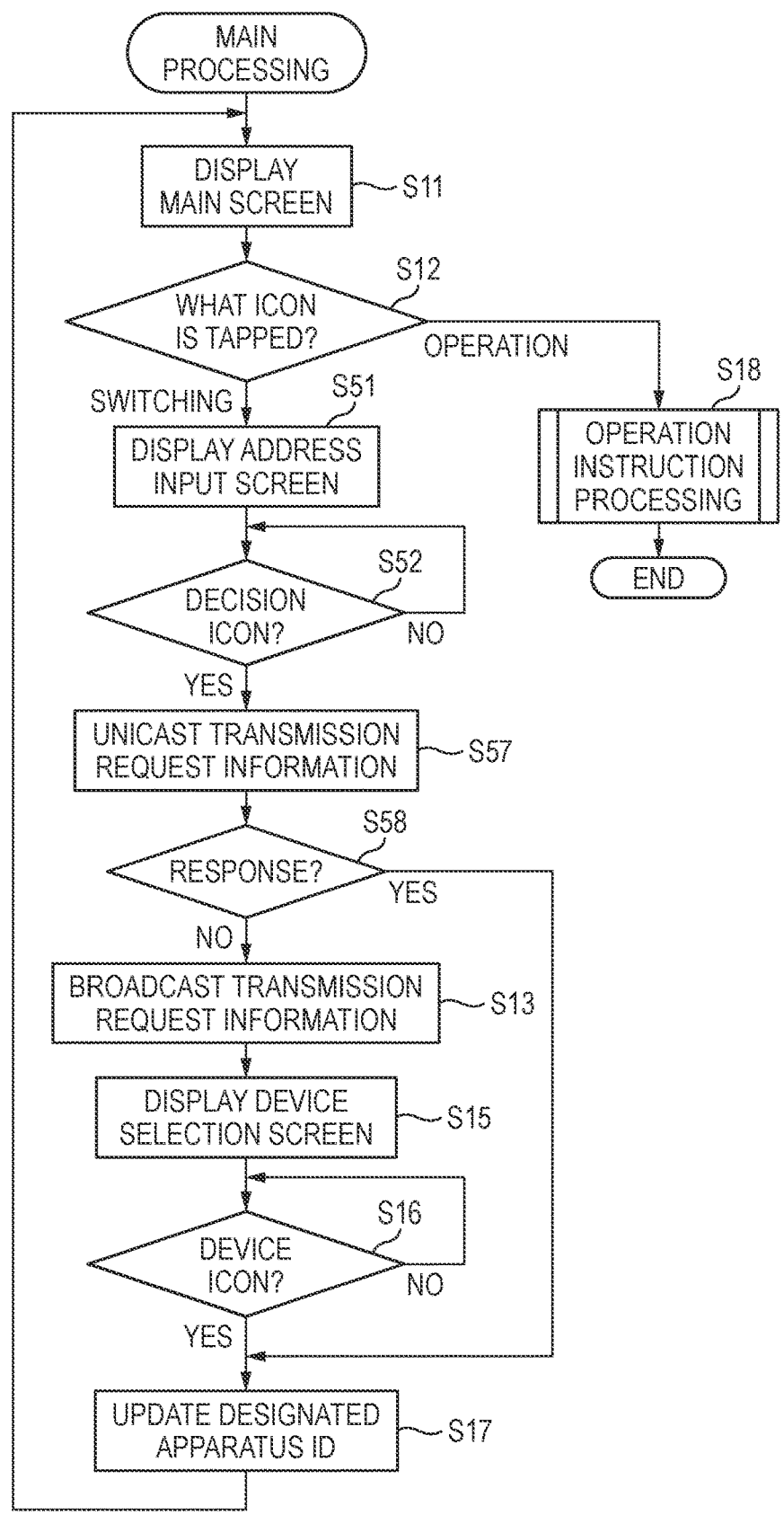
FIG. 11 is a flowchart of main processing in accordance with a modified embodiment.

Meanwhile, in the above illustrative embodiment, in a case where the MFP 10 is not detected in the first search processing, the second search processing is executed. However, the execution order of the search processing is not limited to the above example. Also, the MFP 10 may be searched by a method different from the first search processing, the second search processing, and the third search processing. As another example, in a case where the MFP 10 is not detected in the second search processing, the first search processing may be executed. The main processing of a modified embodiment is described with reference to FIG. 11. The processing common to FIGS. 4 and 6 is denoted with the same reference numerals, and the specific descriptions thereof are omitted.

First, in a case where the designation of the switching icon 113 of the main screen is received through the input I/F 54 (S12: Switch), the terminal program 65 displays the address input screen shown in FIG. 9B on the display 53 (S51). Then, in a case where the input of the IP address and the designation of the [Decision] icon 162 are received through the input I/F 54 (S52: Yes), the terminal program 65 unicasts the transmission request information to the MFP 10 identified with the input IP address (S57). Then, in a case where the apparatus ID is received from the MFP 10 through the communication I/F 55 before the second time period elapses since the transmission request information is unicasted (S58: Yes), the terminal program 65 stores the apparatus ID in the memory 62, as the designated apparatus ID (S17).

On the other hand, in a case where the apparatus ID is not received before the second time period elapses since the transmission request information is unicasted (S58: No), the terminal program 65 broadcasts the transmission request information to the wireless LAN 102 through the communication I/F 55 (S13). Then, the terminal program 65 displays the device selection screen shown in FIG. 7B on the display 53 (S15). The device selection screen includes a device icon corresponding to the apparatus ID received before the first time period elapses since broadcasting the transmission request information. Then, in a case where a user operation of designating one of the device icons is received through the input I/F 54 (S16: Yes), the terminal program 65 stores the apparatus ID corresponding to the designated device icon in the memory 62, as the designated apparatus ID.

That is, in the main processing of the modified embodiment, in a case where the MFP 10 identified with the IP address designated through the address input screen by the user is not detected, the transmission request information is broadcasted to the wireless LAN 102. Thereby, even when the IP address is incorrectly input, the possibility that the MFP 10 can be detected is increased. In the meantime, the processing, which is not shown in FIG. 11, of the processing shown in FIGS. 4 to 6 can also be applied to the modified embodiment.

Also, in the MFP 10 and the portable terminal 50 of the above illustrative embodiment, the diverse programs stored in the memories 32, 62 are executed by the CPUs 31, 61, so that the respective processing to be executed by the controller of the present disclosure is implemented. However, the configuration of the controller is not limited thereto and some or all of the controller may be implemented by the hardware such as an integrated circuit and the like.

Also, the present disclosure can be implemented as not only the MFP 10 and the portable terminal 50 but also a program configured to enable the MFP 10 and the portable terminal 50 to execute the processing. The program may be provided with being recorded in a non-transitory recording medium. The non-transitory recording medium may include a memory mounted on a server that can be connected to the MFP 10 and the portable terminal 50 through the communication network, in addition to a CD-ROM, a DVD-ROM and the like. The program stored in the memory of the server may be transmitted through the communication network such as the Internet, as information or signal indicative of the program.

What is claimed is:

1. A non-transitory computer-readable medium having a program stored thereon and readably by a computer of a portable terminal comprising a communication interface, an input interface, and a memory, the program, when executed by the computer, causes the portable terminal to perform:
    searching an image processing apparatus capable of executing an image processing operation by a first method, in a communication network to which the communication interface is connected;
    determining whether the image processing apparatus is detected in the searching by the first method;
    searching the image processing apparatus by a second method different from the first method in a case where it is determined that the image processing apparatus is not detected as a result of the searching by the first method;
    storing, in the memory, apparatus information for identifying the image processing apparatus detected in the searching by the first method or the searching by the second method, as designated apparatus information; and
    transmitting operation instruction information for instructing execution of the image processing operation to the image processing apparatus identified with the designated apparatus information stored in the memory, through the communication interface,
    wherein in one of the searching by the first method and the searching by the second method, the program causes the portable terminal to perform:

broadcasting transmission request information for requesting transmission of the apparatus information to the communication network through the communication interface, and receiving, as a response to the transmission request information transmitted in the broadcasting, the apparatus information from the image processing apparatus through the communication interface, wherein in the other of the searching by the first method and the searching by the second method, the program causes the portable terminal to perform:

receiving a user operation of specifying address information for identifying the image processing apparatus in the communication network, through the input interface, unicasting the transmission request information to the image processing apparatus identified with the address information that is specified in the receiving of the user operation, through the communication interface, and receiving, as a response to the transmission request information transmitted in the unicasting, the apparatus information from the image processing apparatus through the communication interface, and wherein the program causes the portable terminal to perform, in the determining whether the image processing apparatus is detected in the searching by the first method, determining whether the apparatus information is received before a first time period elapses since the transmission request information is transmitted in the searching by the first method.

2. The non-transitory computer-readable medium according to claim 1, the program causes the portable terminal to perform wherein the program, when executed by the computer, further causes the portable terminal to perform:

in the searching by the first method, executing the broadcasting of the transmission request information and the receiving of the apparatus information as a response to the transmission request information broadcasted, and in the searching by the second method, executing the receiving of the user operation, the unicasting of the transmission request information and the receiving of the apparatus information as a response to the transmission request information unicasted.

3. The non-transitory computer-readable medium according to claim 2, wherein the portable terminal comprises a display, wherein the program, when executed by the computer, further causes the portable terminal to perform in a case where it is determined that the image processing apparatus is not detected as a result of the searching by the first method:

displaying, on the display, a screen including a message for urging a user to specify the address information, a first object and a second object;

receiving a user operation on the screen through the input interface; and executing the searching by the second method in a case where a designation of the first object is received in the receiving the user operation on the screen, and wherein the program causes the portable terminal not to perform the executing the searching by the second method in a case where a designation of the second object is received in the receiving the user operation on the screen.

4. The non-transitory computer-readable medium according to claim 2, wherein the program, when executed by the computer, further causes the portable terminal to perform in a case where the apparatus information as a response to the transmission request information unicasted is not received before a second time period elapses since the transmission request information is transmitted in the unicasting:

multicasting the transmission request information to apparatuses identified with a plurality of address information including a part of the address information specified through the user operation; and receiving, as a response to the transmission request information transmitted in the multicasting, the apparatus information from the image processing apparatus through the communication interface, and wherein the program causes the portable terminal to perform, in the storing of the apparatus information, storing the apparatus information received as a response to the transmission request information multicasted, as the designated apparatus information.

5. The non-transitory computer-readable medium according to claim 4, wherein the second time period is longer than the first time period.

6. The non-transitory computer-readable medium according to claim 2, wherein the program, when executed by the computer, further causes the portable terminal to perform:

storing, in the memory, the address information specified through the user operation in a case where the apparatus information as a response to the transmission request information unicasted is received;

determining whether the address information is stored in the memory in a case where it is determined that the image processing apparatus is not detected as a result of the searching by the first method;

executing the searching by the second method in a case where it is determined that the address information is not stored; and searching the image processing apparatus by a third method different from the first method and the second method in a case where it is determined that the address information is stored, and wherein the program causes the portable terminal to perform in the searching by the third method:

receiving a user operation of designating one of the address information stored in the memory, through the input interface;

unicasting the transmission request information to the image processing apparatus identified with the address information designated by the user operation of designating one of the address information, through the communication interface; and receiving, as a response to the transmission request information unicasted to the image processing apparatus identified with the address information, the apparatus information from the image processing apparatus through the communication interface, and wherein the program causes the portable terminal to perform, in the storing of the designated apparatus information, storing, in the memory; the apparatus information for identifying the image processing apparatus detected in the searching by the first method, the searching by the second method, or the searching by the third method, as the designated apparatus information.

7. The non-transitory computer-readable medium according to claim 6,
- wherein the portable terminal comprises a display,
- wherein the memory stores a connection flag in association with the address information,
- wherein the program causes the portable terminal to perform in a case where the apparatus information as a response to the transmission request information unicasted to the image processing apparatus identified with the address information is received before a third time period elapses since the transmission request information is transmitted in the unicasting:
  - setting a first value for the connection flag associated with the address information designated by the user operation of the designating one of the address information; and
  - executing the storing of the designated apparatus information,
- wherein the program causes the portable terminal to perform in a case where the apparatus information as a response to the transmission request information unicasted to the image processing apparatus identified with the address information is not received before the third time period elapses since the transmission request information is transmitted in the unicasting:
  - setting a second value for the connection flag associated with the address information designated by the user operation of the designating one of the address information; and
  - executing the searching by the second method, and
- wherein the program causes the portable terminal to perform in the searching by the second method:
  - displaying, on the display, a screen including the address information, in hick the second value is set for the corresponding connection flag, out of the address information stored in the memory; and
  - executing the receiving of the user operation of specifying address information at a state where the screen is displayed on the display.

8. The non-transitory computer-readable medium according to claim 7,
- wherein the screen further includes the address information allotted to the communication interface.

9. The non-transitory computer-readable medium according to claim 7,
- wherein the program causes the portable terminal to perform in the searching by the second method:
  - determining whether the address information, that coincides with the address information received by the user operation and in that the second value is set for the corresponding connection flag, is stored in the memory; and
  - executing the unicasting of the transmission request information to the image processing apparatus identified with the address information in a case where it is determined that the address information, that coincides with the address information received by the user operation and in that the second value is set for the corresponding connection flag, is not stored in the memory, and
- wherein the program causes the portable terminal not to perform executing the unicasting of the transmission request information to the image processing apparatus identified with the address information in a case where it is determined that the address information, that coincides with the address information received by the user operation and in that the second value is set for the corresponding connection flag, is stored in the memory.

10. The non-transitory computer-readable medium according to claim 9,
- wherein the program causes the portable terminal to perform, in the setting of the second value, storing, in the memory, time information indicating execution time of the setting of the second value in association with the address information,
- wherein the program causes the portable terminal to perform in the searching by the second method:
  - determining whether elapse time from time indicated by the corresponding time information is equal to or longer than threshold time in a case where it is determined that the address information, that coincides with the address information received by the user operation and in that the second value is set for the corresponding connection flag, is stored in the memory; and
  - executing the unicasting of the transmission request information to the image processing apparatus identified with the address information in a case where it is determined that the elapse time is equal to or longer than the threshold time, and
- wherein the program causes the portable terminal not to perform executing the unicasting of the transmission request information to the image processing apparatus identified with the address information in a case where it is determined that the elapse time is shorter than the threshold time.

11. The non-transitory computer-readable medium according to claim 2,
- wherein the memory stores mode information in which a third value indicating that the communication interface is permitted to perform communication with an external apparatus connected to the communication network or a fourth value indicating that the communication interface is not permitted to perform the communication is set, and
- wherein the program causes the portable terminal to perform:
  - determining a setting value of the mode information after executing the searching by the first method; and
  - switching the setting value of the mode information from the fourth value to the third value prior to the unicasting of the transmission request information to the image processing apparatus identified with the address information in a case where it is determined that the image processing apparatus is not detected as a result of the searching by the first method and it is determined that the setting value is the fourth value.

12. The non-transitory computer-readable medium according to claim 2,
- wherein the memory stores mode information in which a third value indicating that the communication interface is permitted to perform communication with an external apparatus connected to the communication network or a fourth value indicating that the communication interface is not permitted to perform the communication is set, and
- wherein the program causes the portable terminal to perform:
  - determining a setting value of the mode information after executing the searching by the first method; and
  - executing the searching by the second method in a case where it is determined that the image processing apparatus is not detected as a result of the searching by the first method and it is determined that the setting value is the third value, and wherein the program causes the portable terminal to perform in a case where it is determined that the image processing apparatus is not detected as a result of the searching by the first method and it is determined in that the setting value is the fourth value:

switching the setting value of the mode information from the fourth value to the third value; and executing the searching by the first method again after switching the setting value from the fourth value to the third value.

13. A non-transitory computer-readable medium having a program stored thereon and readably by a computer of a portable terminal comprising a communication interface and a memory, the program, when executed by the computer, causes the portable terminal to perform:

searching an image processing apparatus capable of executing an image processing operation by a first method, in a communication network to which the communication interface is connected;

determining whether the image processing apparatus is detected in the searching by the first method;

searching the image processing apparatus by a second method different from the first method in a case where it is determined that the image processing apparatus is not detected as a result of the searching by the first method;

storing, in the memory, apparatus information for identifying the image processing apparatus detected in the searching by the first method or the searching by the second method, as designated apparatus information; and transmitting operation instruction information for instructing execution of the image processing operation to the image processing apparatus identified with the designated apparatus information stored in the memory, through the communication interface.

14. A portable terminal comprising:

a communication interface;

an input interface;

a memory, and a controller, wherein the controller is executable with instructions which, when executed, cause the controller to perform:

searching an image processing apparatus capable of executing an image processing operation by a first method, in a communication network to which the communication interface is connected;

determining whether the image processing apparatus is detected in the searching by the first method;

searching the image processing apparatus by a second method different from the first method in a case where it is determined that the image processing apparatus is not detected as a result of the searching by the first method;

storing, in the memory, apparatus information for identifying the image processing apparatus detected in the searching by the first method or the searching by the second method, as designated apparatus information; and transmitting operation instruction information for instructing execution of the image processing operation to the image processing apparatus identified with the designated apparatus information stored in the memory; through the communication interface, wherein in one of the searching by the first method and the searching by the second method, the controller is executable with instructions which cause the controller to perform:

broadcasting transmission request information for requesting transmission of the apparatus information to the communication network through the communication interface, and receiving, as a response to the transmission request information transmitted in the broadcasting, the apparatus information from the image processing apparatus through the communication interface, wherein in the other of the searching by the first method and the searching by the second method, the controller is executable with instructions which cause the controller to perform:

receiving a user operation of specifying address information for identifying the image processing apparatus in the communication network, through the input interface, unicasting, the transmission request information to the image processing apparatus identified with the address information that is specified in the receiving of the user operation; through the communication interface, and receiving, as a response to the transmission request information transmitted in the unicasting, the apparatus information from the image processing apparatus through the communication interface, and wherein the controller executable with instructions which cause the controller to perform in the determining whether the image processing apparatus is detected in the searching by the first method, determining whether the apparatus information is received before a first time period elapses since the transmission request information is transmitted in the searching by the first method.

* * * * *

UNITED STATES PATENT AND TRADEMARK OFFICE
CERTIFICATE OF CORRECTION

PATENT NO. : 10,666,830 B2
APPLICATION NO. : 16/555018
DATED : May 26, 2020
INVENTOR(S) : Norihiko Asai Page 1 of 1

It is certified that error appears in the above-identified patent and that said Letters Patent is hereby corrected as shown below:

In the Claims

Claim 7, Column 21, Line 35: Delete "in hick" and insert -- in which -- therefor.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*